United States Patent
No et al.

(10) Patent No.: US 10,725,346 B2
(45) Date of Patent: Jul. 28, 2020

(54) LIQUID CRYSTAL DISPLAY

(71) Applicant: SAMSUNG DISPLAY CO., LTD., Yongin-si, Gyeonggi-do (KR)

(72) Inventors: Sang Yong No, Seoul (KR); Kwi Hyun Kim, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 794 days.

(21) Appl. No.: 14/989,023

(22) Filed: Jan. 6, 2016

(65) Prior Publication Data
US 2017/0023833 A1  Jan. 26, 2017

(30) Foreign Application Priority Data
Jul. 22, 2015 (KR) .................. 10-2015-0103566

(51) Int. Cl.
*G02F 1/1343* (2006.01)
*G02F 1/1362* (2006.01)

(52) U.S. Cl.
CPC .... *G02F 1/134309* (2013.01); *G02F 1/13624* (2013.01); *G02F 1/136286* (2013.01); *G02F 2001/134345* (2013.01); *G02F 2001/136218* (2013.01)

(58) Field of Classification Search
None
See application file for complete search history.

(56) References Cited

U.S. PATENT DOCUMENTS

| | | | |
|---|---|---|---|
| 8,022,971 B2* | 9/2011 | Choi | G09G 3/3225 341/110 |
| 2002/0003521 A1* | 1/2002 | Matsueda | G09G 3/2011 345/89 |
| 2004/0114060 A1* | 6/2004 | Kim | G02F 1/134336 349/44 |
| 2007/0046600 A1* | 3/2007 | Sun | G09G 3/3688 345/89 |
| 2010/0321361 A1* | 12/2010 | Weng | G09G 3/3688 345/211 |

(Continued)

FOREIGN PATENT DOCUMENTS

| | | |
|---|---|---|
| KR | 10-2007-0097172 A | 10/2007 |
| KR | 10-2008-0012674 A | 2/2008 |

(Continued)

*Primary Examiner* — Edward J Glick
*Assistant Examiner* — Anthony G Quash
(74) *Attorney, Agent, or Firm* — Kile Park Reed & Houtteman PLLC

(57) ABSTRACT

A liquid crystal display includes first and second voltage divider reference lines, first and second pixel electrodes, and first and second switching circuits. The first and second voltage divider reference lines are on different layers and extend in different directions. The first pixel electrode includes a first sub-pixel electrode and a second sub-pixel electrode, that receives a voltage lower than a voltage to be applied to the first sub-pixel electrode. The second pixel electrode includes a third sub-pixel electrode and a fourth sub-pixel electrode, that receives a voltage lower than a voltage to be applied to the third sub-pixel electrode. The first switching circuit is connected to the first voltage divider reference line, and the second switching circuit is connected to the second voltage divider reference line.

19 Claims, 15 Drawing Sheets

(56) References Cited

U.S. PATENT DOCUMENTS

| | | | | |
|---|---|---|---|---|
| 2015/0185534 A1* | 7/2015 | Park | ............ | G02F 1/13624 |
| | | | | 349/34 |
| 2016/0118000 A1* | 4/2016 | Kim | ............ | G09G 3/3688 |
| | | | | 345/691 |
| 2016/0154281 A1* | 6/2016 | Kwon | ......... | G02F 1/134309 |
| | | | | 257/72 |
| 2016/0246089 A1* | 8/2016 | Jeong | .......... | H01L 29/42384 |
| 2016/0377922 A1* | 12/2016 | Oh | ............ | G02F 1/133707 |
| | | | | 349/96 |

FOREIGN PATENT DOCUMENTS

| KR | 10-2008-0022719 A | 3/2008 |
|---|---|---|
| KR | 10-2008-0048246 A | 6/2008 |
| KR | 10-2009-0005827 A | 1/2009 |
| KR | 10-2010-0052645 A | 5/2010 |
| KR | 10-2013-0027370 A | 3/2013 |
| KR | 10-2014-0045014 A | 4/2014 |

* cited by examiner

LIQUID CRYSTAL DISPLAY

CROSS-REFERENCE TO RELATED APPLICATION

Korean Patent Application No. 10-2015-0103566, filed on Jul. 22, 2015, and entitled, "Liquid Crystal Display," is incorporated by reference herein in its entirety.

BACKGROUND

1. Field

One or more embodiments described herein relate to a liquid crystal display.

2. Description of the Related Art

A liquid crystal display includes a liquid crystal layer between the two substrates formed with electrodes. When a voltage is applied to the electrodes, an electric field is applied to control the alignment of liquid crystal molecules in the liquid crystal layer and also the polarization of incident light. An image is formed as a result.

In a vertical alignment type of liquid crystal display, long axes of the liquid crystal molecules are arranged at right angles with respect to upper and lower display plates when an electric field is not applied. This type of display has a high contrast ratio and a wide reference viewing angle. However, the side visibility of this type of display is less than its front visibility.

In an attempt to increase side visibility, one pixel may be formed to include two sub-pixels. Different voltages may then be applied to cause the sub-pixels to have different permeability. This type of display may also include a switching device connected to each pixel electrode, gate and data lines for applying voltages to the pixel using the switching device, and a voltage divider reference line for adjusting the voltage applied to the sub-pixels. However, this type of display has drawbacks, especially at higher screen resolutions.

SUMMARY

In accordance with one or more embodiments, a liquid crystal display a substrate including a display region and a non-display region; at least one first voltage divider reference line on the substrate and extending in a first direction; at least one second voltage divider reference line on the substrate and on a layer different from the at least one first voltage divider reference line, the at least one second voltage divider reference line extending in a second direction crossing the first direction; a first pixel electrode on the display region and including a first sub-pixel electrode and a second sub-pixel electrode, the second sub-pixel electrode to receive a voltage lower than a voltage to be applied to the first sub-pixel electrode; a second pixel electrode on the display region and including a third sub-pixel electrode and a fourth sub-pixel electrode, the fourth sub-pixel electrode to receive a voltage lower than a voltage to be applied to the third sub-pixel electrode; a first switching circuit including a first gate electrode, a first source electrode connected to the second sub-pixel electrode, and a first drain electrode connected to the at least one first voltage divider reference line; and a second switching circuit including a second gate electrode, a second source electrode connected to the fourth sub-pixel electrode, and a second drain electrode connected to the at least one second voltage divider reference line.

The first drain electrode may be electrically connected to the at least one first voltage divider reference line through a contact-hole, and the second drain electrode may be integrally formed with the second voltage divider reference line and is physically connected to the at least one second voltage divider reference line. The fourth sub-pixel electrode may include a horizontal trunk portion and a vertical trunk portion which divides the fourth sub-pixel electrode into a plurality of domains, and at least a part of the at least one second voltage divider reference line may overlap the vertical trunk portion.

The first voltage divider reference line may include a hold electrode line projecting from the at least one first voltage divider reference line, and at least part of the hold electrode line may overlap the vertical trunk portion of the fourth sub-pixel electrode and the at least one second voltage divider reference line.

The liquid crystal display may include a first gate line and a second gate line on a same layer as the at least one first voltage divider reference line and extending in a direction that does not cross the first direction; a first data line and a second data line on a same layer as the at least one second voltage divider reference line and extending in a direction that crosses the one direction; a third switching device including a third gate electrode, a third source electrode, and a third drain electrode connected to the first source electrode; and a fourth switching device including a fourth gate electrode, a fourth source electrode, and a fourth drain electrode connected to the second source electrode.

The first gate electrode may be connected to the first gate line, the second gate electrode may be connected to the first gate line, the third gate electrode may be connected to the first gate line, the fourth gate electrode may be connected to the first gate line, the third source electrode may be connected to the first data line, and the fourth source electrode may be connected to the second data line.

The first pixel electrode, the first switching circuit, and the third switching circuit may define a first pixel region, the second pixel electrode, the second switching circuit, and the fourth switching device may define a second pixel region, the at least one first voltage divider reference line may extend in the first direction and may overlap the first pixel region and the second pixel region, and the at least one second voltage divider reference line may extend in a direction that crosses the first direction and may not overlap the first pixel region.

The first gate electrode may be connected to the first gate line, the second gate electrode may be connected to the second gate line, the third gate electrode may be connected to the first gate line, the fourth gate electrode may be connected to the second gate line, the third source electrode may be connected to the first data line, and the fourth source electrode may be connected to the first data line.

The first pixel electrode, the first switching circuit, and the third switching device may define a first pixel region, the second pixel electrode, the second switching circuit, and the fourth switching device may define a second pixel region, the at least one first voltage divider reference line may extend in the first direction and may not overlap the second pixel region, and the at least one second voltage divider reference line may extend in a direction that crosses the first direction and may overlap the first pixel region and the second pixel region.

The liquid crystal display may include a first color filter in a region that overlaps the first pixel electrode; and a second color filter in a region that overlaps the second pixel electrode. A color to be output from the second color filter may have a wavelength shorter than a wavelength of a color to be output from the first color filter. A second voltage divider reference voltage applied to the at least one second voltage divider reference line may be greater than a first voltage divider reference voltage to be applied to the at least one first voltage divider reference line. The first voltage divider reference line may be electrically connected to the second voltage divider reference line.

The liquid crystal display may be a plurality of first voltage divider reference lines and a plurality of second voltage divider reference lines, ends of the first voltage divider reference lines are connected to each other to form a first voltage divider reference line bundle, ends of the second voltage divider reference lines are connected to each other to form a second voltage divider reference line bundle, and the first voltage divider reference line bundle and the second voltage divider reference line bundle are electrically connected to each other on the non-display region that is a light blocking region.

The liquid crystal display may include a voltage divider reference voltage driver on the non-display region, wherein the first voltage divider reference line and the second voltage divider reference line are electrically connected to the voltage divider reference voltage driver. The liquid crystal display may include a shield electrode on the substrate and in a region overlapping the data line, wherein the shield electrode is electrically connected to the first voltage divider reference line.

In accordance with one or more other embodiments, a liquid crystal display includes a first substrate; at least one data line on the first substrate and extending in a first direction, the at least one data line to receive a data voltage; at least one first voltage divider reference line on the first substrate and extending to cross the data line, the at least one first voltage divider reference line to receive a first voltage divider reference voltage; and at least one second voltage divider reference line on the first substrate and extending to cross the first voltage divider reference line, the at least one second voltage divider reference line to receive a second voltage divider reference voltage, wherein the first voltage divider reference line and the data line are on different layers, wherein a polarity of the data voltage is to change on a frame-by-frame basis and a level of the date voltage is different from a level of the second voltage divider reference voltage in one frame period.

The liquid crystal display may include a second substrate facing the first substrate; and a common electrode on the second substrate and facing the first substrate, the common electrode to receive a common voltage, wherein a level of a voltage difference between the data voltage and the common voltage is greater than a level of a voltage difference between the second voltage divider reference voltage and the common voltage in the one frame period. The first voltage divider reference line and the second voltage divider reference line may be on different layers. A level of the first voltage divider reference voltage may be substantially equal to a level of the second voltage divider reference voltage.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
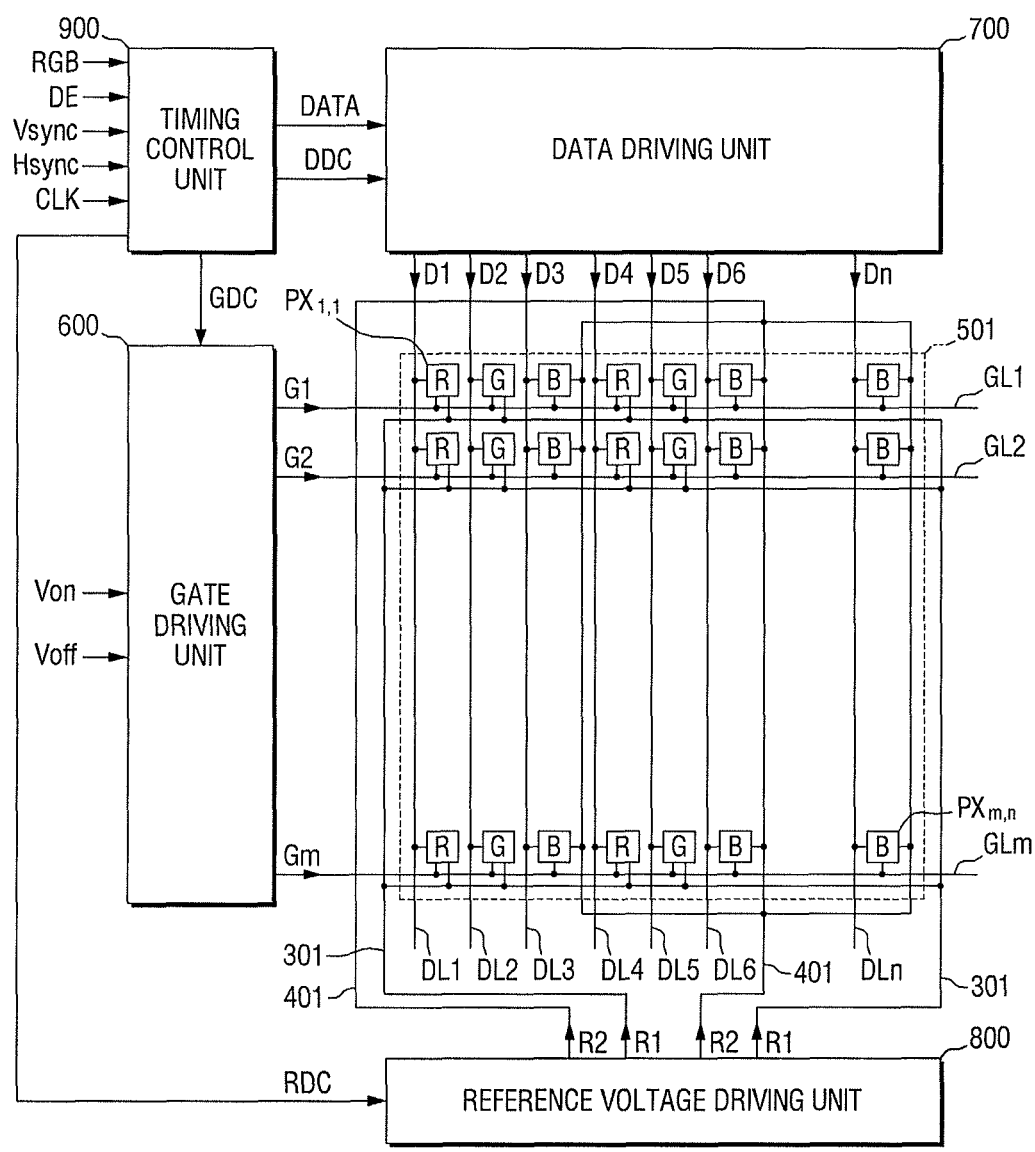
FIG. 1 illustrates an embodiment of a liquid crystal display.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically, electrically and/or fluidly connected to each other.

Figure 2:
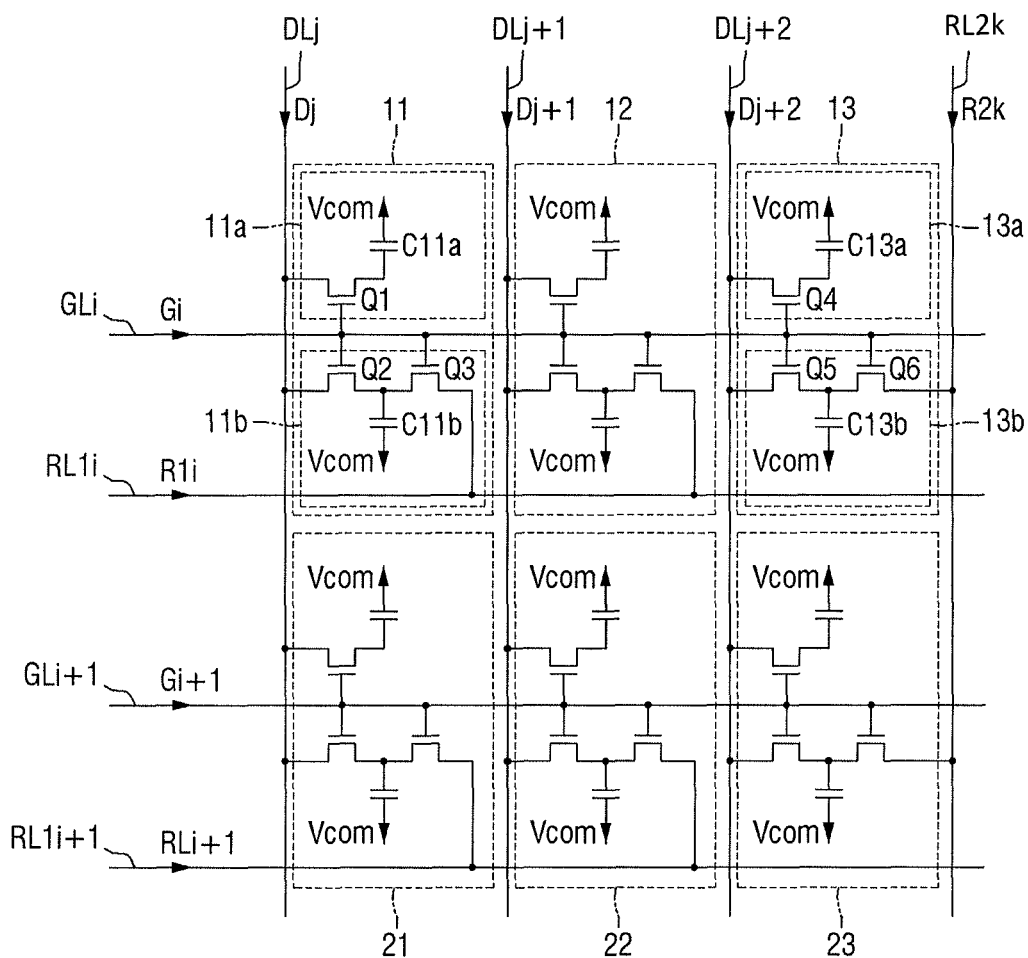
FIG. 2 illustrates an embodiment of some pixels of the liquid crystal display.
Figure 3:
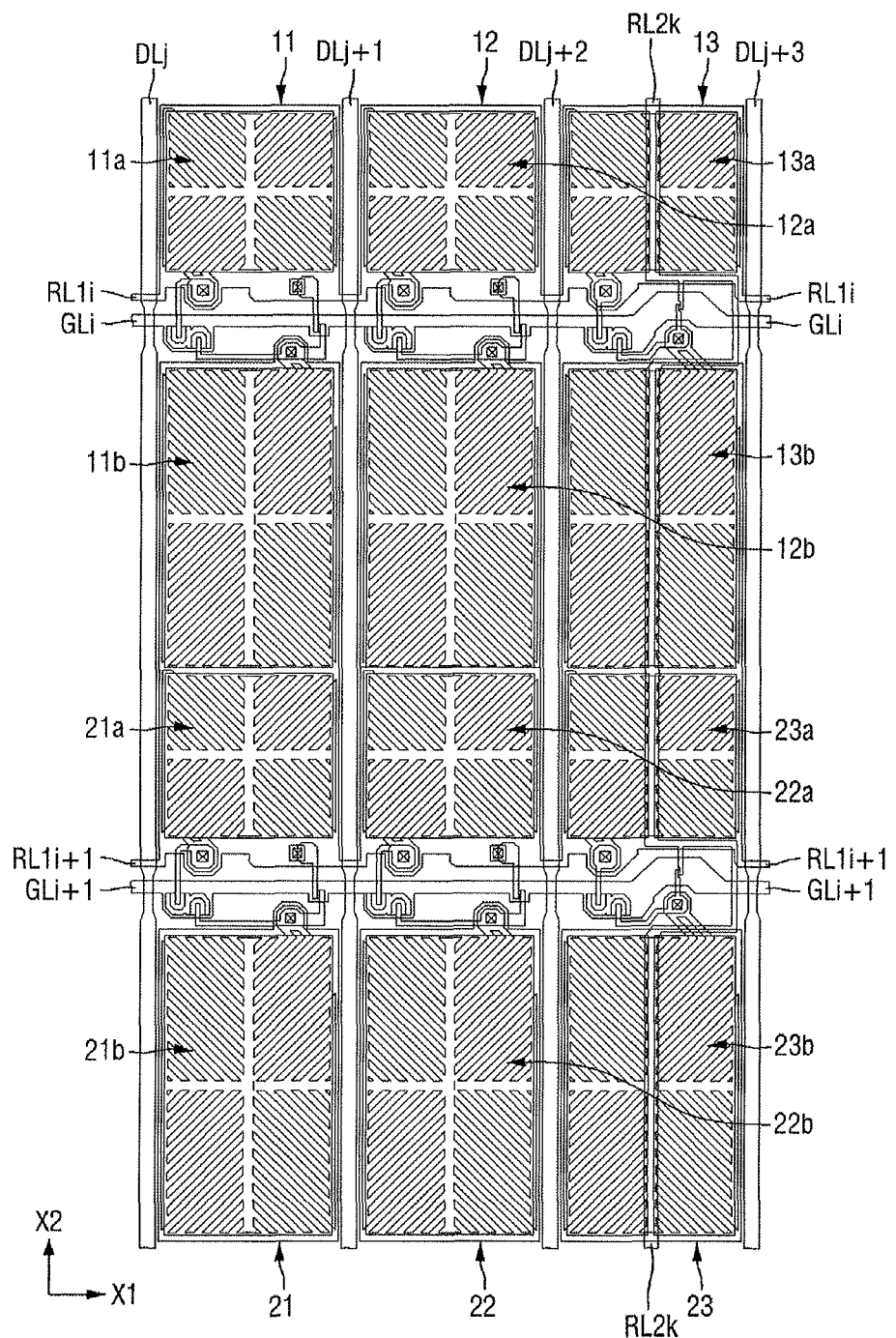
FIG. 3 illustrates a layout embodiment of pixels.

FIG. 1 illustrates an embodiment of a liquid crystal display 1001. FIG. 2 illustrates an example of an equivalent circuit diagram of some pixels of the liquid crystal display 1001. FIG. 3 illustrates an example of a layout the pixels in FIG. 2.

Referring to FIG. 1, the liquid crystal display 1001 includes a display region 501 and a non-display region. The display region 501 displays an image and the non-display region does not display an image. The display region 501 may be surrounded by the non-display region.

The display region 501 includes a plurality of gate lines GL1 to GLm extending in a first direction (e.g., row direction), a plurality of data lines DL1 to DLn extending in a second direction (e.g., column direction) crossing the first direction. A plurality of pixels PX1,1 to PXm,n are formed at respective intersections of the gate lines GL1 to GLm and data lines DL1 to DLn. The pixels PX1,1 to PXm,n are arranged in the form of a matrix, where m and n are integers greater than 0.

Each pixel may display one color among primary colors to implement color display. Examples of primary colors are red, green, and blue. A pixel that displays red is referred to as a red pixel R, a pixel that displays green is referred to as a green pixel G, and a pixel that displays blue is referred to as a blue pixel B. The pixels may display a different number of colors or different colors in another embodiment.

The liquid crystal display 1001 has a stripe-type pixel arrangement in this embodiment. In this arrangement, a basic unit is formed from one red pixel R, one green pixel B, and one blue pixel B. These basic units are repeatedly arranged in the row direction, and the same color pixels are repeatedly arranged in the column direction. The liquid crystal display 1001 may have a different type of pixel arrangement in another embodiment.

The display region 501 of the liquid crystal display 1001 includes a first voltage divider reference line bundle 301 and a second voltage divider reference line bundle 401. Each of the first voltage divider reference line bundle 301 and the second voltage divider reference line bundle 401 includes a plurality of first voltage divider reference lines and a plurality of second voltage divider reference lines. The first voltage divider reference lines are parallel to one another roughly in the row direction, and their ends are connected to one another. The second voltage divider reference lines extend in parallel to one another roughly in the column direction, and their ends are connected to one another.

The non-display region may be a light blocking region which includes a gate driving unit 600 that provides gate signals G1 to Gm to the pixels of the display region 501, a data driving unit 700 that provides data signals D1 to Dn, a voltage divider reference driving unit 800 that provides voltage divider reference voltages R1 and R2, and a timing control unit 900 that controls the above-described units may be arranged. The gate lines GL1 to GLm, the data lines DL1 to DLn, and the first and second voltage divider reference lines may extend from the display region 501 to the non-display region and may be electrically connected to the respective driving units 600, 700, and 800. Further, the gate driving unit 600, the data driving unit 700, and the voltage divider reference driving unit 800 may be electrically connected to the timing control unit 900.

The timing control unit 900 receives various kinds of signals from one or more external sources and controls the gate driving unit 500, the data driving unit 700, and the voltage divider reference driving unit 800. For example, the timing control unit 900 receives an input video signal RGB from an external graphic controller and an input control signal CS for controlling the display of the input video signal RGB, and outputs a gate driving unit control signal GDC, a data driving unit control signal DDC, a voltage divider reference control signal RDC, and a video data signal DATA.

The input video signal RGB may include information on luminance values of the pixels PX1,1 to PXm,n of the display region 501. The luminance value information may correspond, for example, to a predetermined number of grayscales, e.g., 1024, 256, or 64 gray scale values. The input video signal RGB may be divided in the unit of a frame. The input control signal CS transferred to the timing control unit 900 may include, for example, a vertical sync signal Vsync, a horizontal sync signal Hsync, a clock signal CLK, and a data enable signal DE, but is not limited thereto. The input control signal CS may, alternatively or additionally, include other kinds of signals.

The timing control unit 900 receives the input control signal (e.g., vertical sync signal Vsync and clock signal CLK) and outputs the gate driving unit control signal GDC. The gate driving unit control signal GDC may be an operation control signal of the gate driving unit 600. For example, the gate driving unit control signal GDC may include a gate start pulse GSP and a gate output enable signal GOE.

The gate driving unit 600 generates the gate signals G1 to Gm, which include gate voltages and gate pulses that activate the respective pixels of the display region 501 according to the gate driving unit control signal GDC. The gate driving unit 600 transfers the gate signals G1 to Gm to corresponding gate lines GL1 to GLm.

The timing control unit 900 receives the input control signal (e.g., horizontal sync signal Hsync, clock signal CLK, and data enable signal DE) and outputs the data driving unit control signal DDC. The data driving unit control signal DDC may be an operation control signal of the data driving unit 700. The data driving unit control signal DDC may include, for example, a source shift clock SSC, a source start pulse SSP, a polarity control signal POL, and a source output enable signal SOE.

The data driving unit 700 may generate data signals D1 to Dn, which include data voltages corresponding to the video data signal DATA and the data driving unit control signal DDC from the timing control unit 900. The data driving unit 700 transfers the data signals to corresponding data lines DL1 to DLn. The polarities of the data voltages may be changed on a frame-by-frame basis or according to another pattern.

The voltage divider reference driving unit 800 may be a voltage supply unit that generates the first voltage divider reference voltage R1 and the second voltage divider reference voltage R2 in accordance with the voltage divider reference control signal RDC from the timing control unit 900. The voltage divider reference driving unit 800 transfers the voltages to corresponding first and second voltage divider reference line bundles 301 and 401. In one embodiment, the voltage divider reference driving unit 800 may receive the clock signal CLK.

In another embodiment, the liquid crystal display may include a separate common voltage driving unit, or the voltage divider reference driving unit may generate not only the voltage divider reference voltages but also a common voltage. In this case, the common voltage driving unit or the voltage supply unit may provide the common voltage to the common electrode of the liquid crystal display through a common line.

FIG. 2 illustrates an example of some pixels of the liquid crystal display 1001 in FIG. 1. In FIG. 2, pixels 11 and 21 are red pixels R in the same column, pixels 12 and 22 are green pixels G in the same column, and pixels 13 and 23 are blue pixels B in the same column. The red pixel R, the green pixel G, and the blue pixel B, which constitute a basic unit, may be repeatedly arranged in the row direction.

Referring to FIGS. 1 and 2, the first pixel 11 is connected to the first gate line GL1, the first data line DLj, and the first voltage divider reference line RL1$i$. The first pixel 11 receives the first data signal Dj and the first voltage divider reference voltage R1$i$ from the first data line DLj and the first voltage divider reference line RL1$i$ in response to the first gate signal Gi from the first gate line GLi. The first voltage divider reference voltage R1$i$ may be, for example, a constant voltage equal to the common voltage Vcom, or a voltage having the same polarity as the data voltage with respect to the common voltage Vcom. Here, i and j are integers greater larger than 0.

The first pixel 11 includes a first switching device Q1, a second switching device Q2, a third switching device Q3, a first liquid crystal capacitor C11$a$, and a second liquid crystal capacitor C11$b$. Each of the first and second liquid crystal capacitors C11$a$ and C11$b$ may have terminals that correspond to the pixel electrode and common electrode, to which the common voltage Vcom is applied. A dielectric material corresponding to the liquid crystal layer is between the terminals. In one embodiment, the first pixel may further include a hold capacitor.

The first to third switching devices Q1, Q2, and Q3 may be, for example, three-terminal devices. The control terminal of the first switching device Q1 may be connected to the first gate line GLi, the input terminal may be connected to the first data line DLj, and the output terminal may be connected to the first liquid crystal capacitor C11a. The control terminal of the second switching device Q2 may be connected to the first gate line GLi, the input terminal may be connected to the first data line DLj, and the output terminal may be connected to the second liquid crystal capacitor C11b. Further, the control terminal of the third switching device Q3 may be connected to the first gate line GLi, the input terminal thereof may be connected to the output terminal of the second switching device Q2, and the output terminal thereof may be connected to the first voltage divider reference line RL1i. The second pixel 12 may have substantially the same configuration as the configuration of the first pixel 11.

The third pixel 13 is connected to the first gate line GL1, the second data line DLj+2, and the second voltage divider reference line RL2k. The third pixel 13 may receive the second data signal Dj+2 and the second voltage divider reference voltage R2k provided from the second data line DLj+2 and the second voltage divider reference line RL2k in response to the first gate signal Gi provided through the first gate line GLi. The second voltage divider reference voltage R2k may be, for example, a voltage having the same level and polarity as those of the first voltage divider reference voltage R1i, or a voltage having the level and polarity different from those of the first voltage divider reference voltage R1i. Here, i, j, and k are integers greater than 0.

The third pixel 13 includes a fourth switching device Q4, a fifth switching device Q5, a sixth switching device Q6, a third liquid crystal capacitor C13a, and a fourth liquid crystal capacitor C13b. The control terminal of the fourth switching device Q4 may be connected to the first gate line GLi, the input terminal may be connected to the second data line DLj+2, and the output terminal may be connected to the third liquid crystal capacitor C13a. Further, the control terminal of the fifth switching device Q5 may be connected to the first gate line GLi, the input terminal may be connected to the second data line DLj+2, and the output terminal may be connected to the fourth liquid crystal capacitor C13b. Further, the control terminal of the sixth switching device Q6 may be connected to the first gate line GLi, the input terminal may be connected to the output terminal of the fifth switching device Q5, and the output terminal may be connected to the second voltage divider reference line RL2k.

Operation of the first pixel 11 in one fame period will now be described as a representation of the pixels in the liquid crystal display. When the gate signal Gi is applied to the first gate line GLi, the first switching device Q1, the second switching device Q2, and the third switching device Q3 of the first pixel 11 are turned on.

Accordingly, the data voltage from the first data line D1j is applied to a first sub-pixel electrode, that is one electrode of the first liquid crystal capacitor C11a, through the first switching device Q1 that is turned on. In this case, the first liquid crystal capacitor C11a is charged high based on a difference between the data voltage and the common voltage Vcom. The first liquid crystal capacitor C11a is charged with a voltage higher than the voltage charged in the second liquid crystal capacitor C11b, to be described later, to control the liquid crystals. The pixel region defined by the first liquid crystal capacitor C11a may be referred to as a first sub-pixel 11a or a high-pixel.

At the same time, the second and third switching devices Q2 and Q3 that are turned on electrically connect the input terminal of the second switching device Q2 to the output terminal of the third switching device Q3. In this case, the data voltage from the first data line DLj is applied to the input terminal of the second switching device Q2, and the first voltage divider reference voltage R1i having a level lower than the level (absolute value) of the data voltage is applied to the output terminal of the third switching device Q3. Accordingly, a specific voltage, having a level between levels of the data voltage and the voltage divider reference voltage R1i, is applied to a second sub-pixel electrode that corresponds to one electrode of the second liquid crystal capacitor C11b through a voltage drop.

In this case, the second liquid crystal capacitor C11b may be charged high based on a difference between the specific voltage, that is lower than the data voltage, and the common voltage Vcom. Accordingly, the second liquid crystal capacitor C11b is charged with a voltage lower than the voltage charged in the first liquid crystal capacitor C11a to control the liquid crystals. The pixel region defined by the second liquid crystal capacitor C11b may be referred to as a second sub-pixel 11b or low-pixel.

In the case of a high pixel in which a relatively high voltage is charged, side visibility may be reduced at low grayscale values where liquid crystals are vertically aligned. In the case of a low-pixel in which a relatively low voltage is charged, side visibility may be reduced at middle and high grayscale values where the liquid crystals are close to horizontal alignment.

Thus, charged voltages of the two liquid crystal capacitors C11a and C11b correspond to different gamma curves. The gamma curve for one pixel voltage, which is recognized by a viewer, corresponds to a curve obtained by synthesizing the different gamma curves. The synthesized gamma curve on the front side is made to coincide with the most suitably determined front reference gamma curve, and the synthesized gamma curve on the side is made to maximally approach the front reference gamma curve. By converting the video data as described above, side visibility may be improved.

The foregoing describes operation of the first pixel 11. The second voltage divider reference line RL2k of the third pixel 13 may perform the same function as the first voltage divider reference line RL1i, and the same effect may be obtained, for example, by making the level of the first or second voltage divided reference voltage higher than the level of the data voltage.

Referring to FIGS. 1 to 3, the gate lines GLi to GLI+1 extend substantially in parallel to each other roughly in a first direction X1. The data lines DLj to DLj+3 are insulated from the gate lines GLi to GLi+1 and extend substantially in parallel to each other in a second direction X2 that crosses the first direction X1. As described above, one gate line GLi may be electrically connected to the switching devices of the pixels 11, 12, and 13 that are repeatedly arranged in the first direction X1. Also, one data line DLj may be electrically connected to the switching devices of the pixels 11 and 21 that are repeatedly arranged in the second direction X2.

Further, the first voltage divider reference lines RL1i to RL1i+1 may extend substantially in parallel to the gate lines GLi to GLi+1 roughly in the first direction X1. The number of first voltage divider reference lines may, for example, be equal to the number of gate lines GL1 to GLm. The voltage divider reference line RL1$i$ may be formed in a region which overlaps the pixels 11, 12, and 13 that are repeatedly arranged in the first direction X1, may be electrically connected to the switching devices of the red pixel 11 and the green pixel 12, and may not be directly connected to the switching device of the blue pixel 13.

On the other hand, the second voltage divider reference line RL2$k$ is not formed in a region that overlaps the red pixels 11 and 12 and the green pixels 21 and 22, and extends from a region that overlaps the blue pixels 13 and 23 roughly in the second direction X2 through the blue pixels 13 and 23. Accordingly, the second voltage divider reference line RL2$k$ may be electrically connected to the switching devices of the blue pixels 13 and 23. The number of the second voltage divider reference lines may, for example, be about ⅓ of the number of data lines DL1 to DLn.

Figure 4:
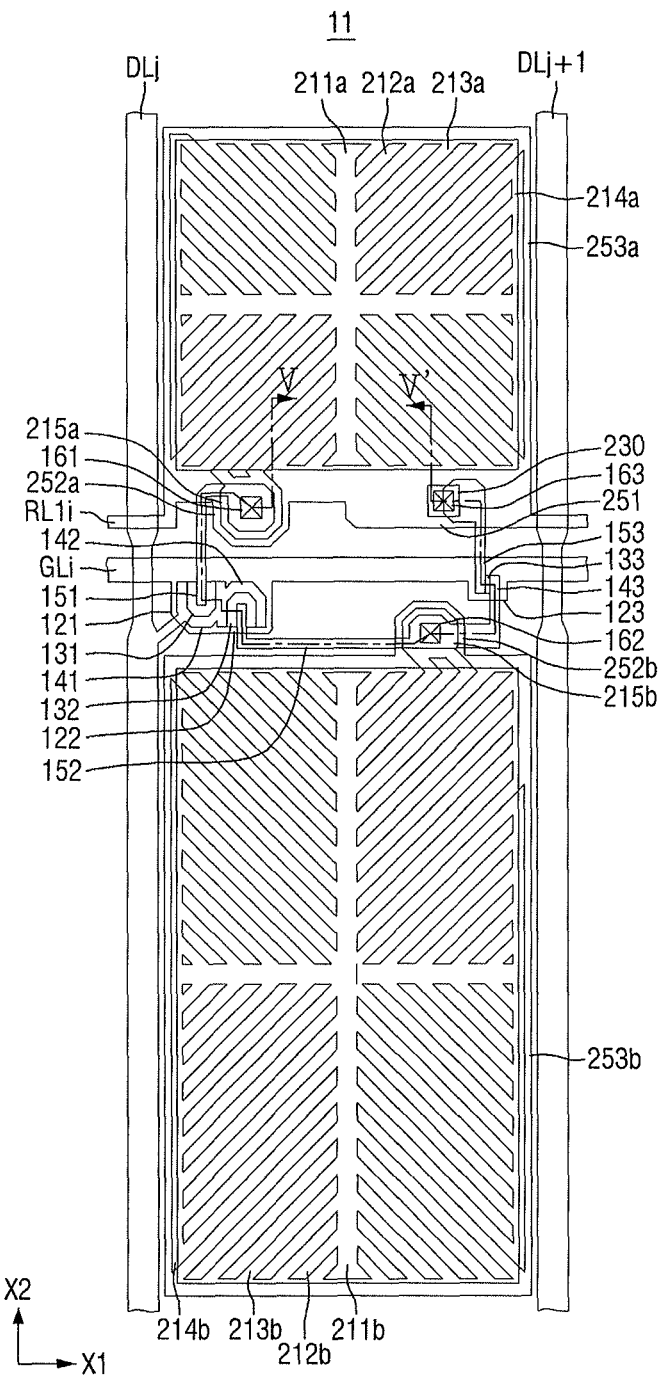
FIG. 4 illustrates a layout embodiment of one pixel.
Figure 5:
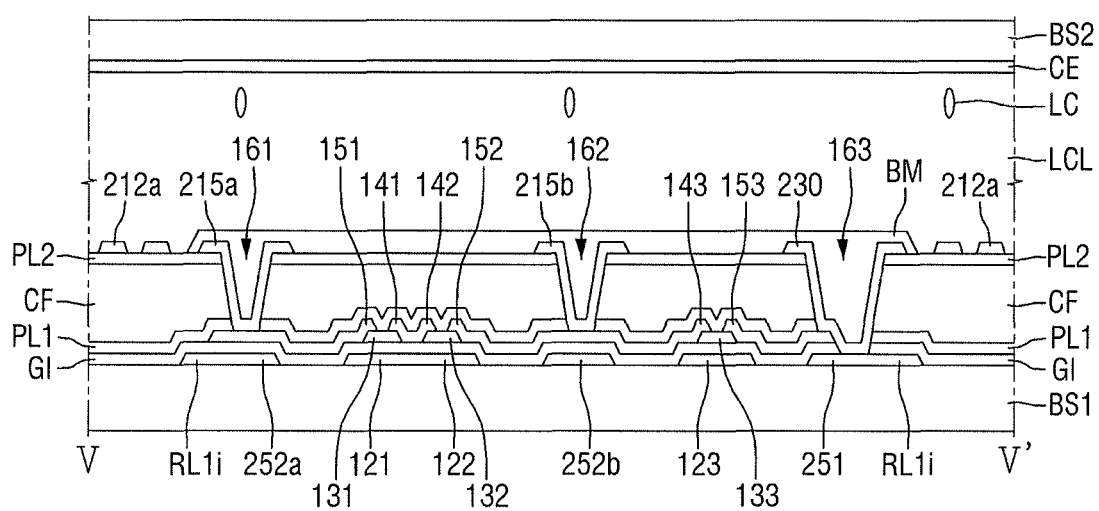
FIG. 5 illustrates a view taken alone section line V-V' in FIG. 4.

FIG. 4 illustrates a layout embodiment of one pixel in FIG. 3, and FIG. 5 is an example of a cross-sectional view taken along line V-V' in FIG. 4. Referring to FIGS. 4 and 5, the liquid crystal display 1001 includes a first substrate BS1, a second substrate BS2 spaced apart from the first substrate BS1 and facing the first substrate BS1, and a liquid crystal layer LCL between the first substrate BS1 and the second substrate BS2. The first and second substrates BS1 and BS2 are transparent or opaque insulating substrates, and may be, for example, silicon substrates, glass substrates, or plastic substrates. The liquid crystal layer LCL may include liquid crystal molecules LC having, for example, negative dielectric anisotropy. Additionally, or alternatively, the liquid crystal layer LCL may include liquid crystal molecules having positive dielectric anisotropy.

The first gate line GLi is formed on the first substrate BS1 and extends roughly in the first direction X1. A first gate electrode 121 and a second gate electrode 121 project from the first gate line GLi, and the first gate electrode 121 and the second gate electrode 122 may be integrally formed without any physical boundary between them. For example, the first gate electrode 121 and the second gate electrode 122 may project downward from the first gate line GLi, and the first gate electrode 121 may be located on the left side than the second gate electrode 122. Further, a third gate electrode 123 is formed in a region that overlaps the extended first gate line GLi. For example, the first to third gate electrodes 121, 122, and 123 may be physically connected to the same first gate line GLi, and the same gate signal Gi may be applied to the first to third gate electrodes 121, 122, and 123.

The first voltage divider reference line RL1$i$ is formed on the same layer as the first gate line GLi, and extends substantially in parallel to the first gate line GLi. As described above, the first voltage divider reference line RL1$i$ may provide the first voltage divider reference voltage R1$i$. Through this, the low-pixel, to which a relatively low voltage is applied in comparison to the high-pixel 210$a$, may be implemented.

The first voltage divider reference line RL1$i$ may include a voltage divider reference electrode 251, a hold electrode 252$a$, and an edge hold electrode line 253$a$. The voltage divider reference electrode 251 projects downward from the first voltage divider reference line RL1$i$ to have a wide surface, and thus may provide a space to allow for stable contact with a third drain electrode 153.

The hold electrode 252$a$ may be arranged adjacent the voltage divider reference electrode 251. The hold electrode 252$a$ may also project downward from the first voltage divider reference line RL1$i$ to have a wide surface. The hold electrode 252$a$ may form a hold capacitor together with a first drain electrode 151 formed to overlap an upper portion of the hold electrode 252$a$. A plurality of protection layers may be formed between the hold electrode 252$a$ and the first drain electrode 151. The extended surface of the voltage divider reference electrode 251 and the extended surface of the hold electrode 252$a$ do not continue with each other. The width of the first voltage divider reference line RL1$i$, between the extended surface of the voltage divider reference electrode 251 and the extended surface of the hold electrode 252$a$, may be reduced to an extent. However, the width of the first voltage divider reference line RL1$i$ may be equal to the width of the extended surfaces of the voltage divider reference electrode 251 and the hold electrode 252$a$. Further, the voltage divider reference electrode 251 and the hold electrode 252$a$ may be continuously formed, without discriminating the boundary between the voltage divider reference electrode 251 and the hold electrode 252$a$.

The edge hold electrode line 253$a$ may project from the first voltage divider reference line RL1$i$ and may partially overlap the first sub-pixel electrode 210$a$. The edge hold electrode line 253$a$ may surround the outline of the first sub-pixel electrode 210$a$. In another embodiment, the hold electrode and/or the edge hold electrode line may be omitted and may have a different shape and/or arrangement.

A gate insulating layer GI may be arranged just on the gate line GLi and the first voltage divider reference line RL1$i$ over the whole upper surface of the first substrate BS1. The gate insulating layer GI includes an insulating material which electrically insulates a layer on the upper portion thereof from a layer on the lower portion thereof. Examples of the insulating material include silicon nitride (SiNx), silicon oxide (SiOx), silicon oxynitride (SiOxNy), and silicon nitride oxide (SiNxOy).

A plurality of data lines DLj to DLj+1, which include first to third semiconductor layers 131, 132, and 133 and a first data line DLj, may be formed on the gate insulating layer GI. The first data line DLj extends roughly in the second direction X2 and crosses the first gate line GLi. A data signal Dj is applied to the data line DLj.

The first to third semiconductor layers 131, 132, and 133 are formed in a region that overlaps the first to third gate electrodes 121, 122, and 123. The first to third semiconductor layers 131, 132, and 133 may serve as a channel of a thin film transistor.

First to third source electrodes 141, 142, and 143 and first to third drain electrodes 151, 152, and 153 may be formed on the gate insulating layer GI and the first to third semiconductor layers 131, 132, and 133 and may at least partly overlap each other. An ohmic contact layer 142 may be provided between the source/drain electrode and the semiconductor layer.

A first source electrode 141 and a second source electrode 142 may be connected to each other without physical boundaries between them, and may be formed to project from the data line DLj in a direction of the first and second gate electrodes 121 and 122. The first and second source electrodes 141 and 142 may be bent, for example, in a "U" shape.

The first drain electrode 151 is formed on the first gate electrode 121 and the first semiconductor layer 131 to be spaced apart from the first source electrode 141. The second drain electrode 152 is formed on the second gate electrode 122 and the second semiconductor layer 132 to be spaced apart from the second source electrode 142. The first and second drain electrodes 151 and 152 may be electrically connected to first and second sub-pixel electrodes 210a and 210b through first and second contact-holes 161 and 162.

The third source electrode 143 is formed on the third gate electrode 123 and the third semiconductor layer 133. The third source electrode 143 is physically connected to the second drain electrode 152. The third drain electrode 153 is formed on the third gate electrode 123 and the third semiconductor layer 133 to be spaced apart from the third source electrode 143. Further, the third drain electrode 153 may be electrically connected to a voltage divider reference electrode 251 through a third contact-hole 163.

The gate electrode, the semiconductor layer, the source electrode, and the drain electrode as described above constitute a thin film transistor that is a three-terminal switching device. For example, the first gate electrode 121 is a control terminal of the first switching device Q1 and is electrically connected to the first gate line GLi. The first source electrode 141 is an input terminal and is electrically connected to the first data line DLj. The first drain electrode 151 is an output terminal and is electrically connected to the first sub-pixel electrode 210a.

The second gate electrode 122 is a control terminal of the second switching device Q2 and is electrically connected to the first gate line GLi. The second source electrode 142 is an input terminal and is electrically connected to the first data line DLj. The second drain electrode 152 is an output terminal and is electrically connected to the second sub-pixel electrode 210b.

The third gate electrode 123 is a control terminal of the third switching device Q3 and is electrically connected to the first gate line GLi. The third source electrode 143 is an input terminal and is electrically connected to the second drain electrode 152. The third drain electrode 153 is an output terminal and is electrically connected to the voltage divider reference electrode 251.

A protection layer may be entirely arranged on the data lines DLj to DLj+1 and the first to third switching devices Q1 to Q3. The protection layer may include a first protection layer PL1, a planarization layer CF, and a second protection layer PL2. The protection layer may be formed of an organic layer and/or inorganic layer and may have a single-layer or multilayer structure.

The first protection layer PL1 may include an inorganic insulating material, e.g., silicon nitride or silicon oxide. The first protection layer PL1 prevents the wirings and electrodes on a lower portion thereof from coming into direct contact with the organic material.

The planarization layer CF is arranged on the first protection layer PL1 and includes an organic material. The planarization layer CF may be spread over the whole upper surface of the first substrate BS1 in order to make a plurality of constituent elements laminated on the first substrate BS1 have a uniform height. In one embodiment, a color filter may be arranged on the first protection layer PL1. The planarization layer CF may be arranged on the color filter, or the planarization layer CF may include the color filter. The color filter may be arranged between the neighboring data lines DLj to DLj+1. The color filter may selectively transmit light having a specific wavelength, and different color filters that transmit light of different wavelengths may be arranged on a pixel-by-pixel basis.

The second protection layer PL2 may be arranged on the planarization layer CF. The second protection layer PL2 may prevent the planarization layer CF or the color filter from coming undone. The second protection layer PL2 may also suppress pollution of the liquid crystal layer LCL due to an organic material, such as a solvent, that flows in from the planarization layer CF or the color filter. Accordingly, a defect (e.g., afterimage) during driving of a screen may be prevented.

Contact holes may be formed on the first protection layer PL1, the planarization layer CF, and the second protection layer PL2. The contact holes may expose parts of the first to third drain electrodes 151, 152, and 153, and the voltage divider reference electrode 251. The first drain electrode 151 is electrically connected to the first sub-pixel electrode 210a through the first contact hole 161, the second drain electrode 152 is electrically connected to the second sub-pixel electrode 210b through the second contact hole 162, and the third drain electrode is electrically connected to the voltage divider reference electrode 251 through the third contact hole 163 and a contact electrode 230 formed on the third contact hole 163.

A first pixel electrode 210 and a contact electrode 230 are formed on a region exposed by the second protection layer PL2 and the first to third contact holes 161, 162, and 163. The contact electrode 230 serves to electrically connect the third drain electrode 153 to the voltage divider reference electrode 251 that is exposed through the third contact hole 163. The contact electrode 230 may be formed, for example, of the same material as the first pixel electrode 210 through an integrated process.

The first pixel electrode 210 may form an electric field with the common electrode CE on the second substrate BS2, to thereby control the alignment direction of liquid crystal molecules LC of the liquid crystal layer LCL between the first pixel electrode 210 and the common electrode CE. The first pixel electrode 210 may be a transparent electrode. Examples of materials that form the transparent electrode may be indium tin oxide (ITO) and indium zinc oxide (IZO).

The first pixel electrode 210 includes the first and second sub-pixel electrodes 210a and 210b that are spaced apart from each other. As described above, the first sub-pixel electrode 210a may be electrically connected to the first drain electrode 151 that is the output terminal of the first switching device Q1. The second sub-pixel electrode 210b may be electrically connected to the second drain electrode 152 that is the output terminal of the second switching device Q2.

The first sub-pixel electrode 210a may have roughly a rectangular shape as a whole and may include a projection portion 251a that projects downward. The first sub-pixel electrode 210a may be a pattern electrode having a slit pattern. The slit pattern of includes a trunk portion 211a, a plurality of branch portions 212a extending from the trunk portion 211a, a slit portion 213a between the trunk portions 212a, and a connection portion 214a at left and right ends of the first sub-pixel electrode 210a to connect the plurality of branch portions 212a.

The trunk portion 211a may have roughly in a cross (+) shape, and the branch portions 212a may be radially spread in a direction tilted from the cross-shaped trunk portion 211a, for example, in a direction roughly at an angle of 45°. Accordingly, the first sub-pixel electrode 210a may have four domain regions which are divided by the trunk portion 211a and may have different directivities of the branch portions 212a. The domain regions serve as directors of the liquid crystal molecules LC, and form domains that cause the alignment directions of the liquid crystal molecules LC to be different from each other during driving. As a result, as the liquid crystal control force is improved, the viewing angle is increased, the texture is decreased, and thus permeability and response speed are improved.

At least parts of the radially spread branch portions 212a may be connected to each other through the connection portion 214a at left and right ends thereof. Further, on the lower side of the first sub-pixel electrode 210a, a projection portion 215a is electrically connected to the first drain electrode through the first contact hole 161 as described above. In this case, the first sub-pixel electrode 210a may correspond to the high-pixel.

The second sub-pixel electrode 210b may have roughly the same shape and construction as the first sub-pixel electrode 210b as a whole. However, the second sub-pixel electrode 210b may have a rectangular shape with a width longer than its length. The area ratio of the first sub-pixel electrode 210a to the second sub-pixel electrode 210b in plane may be, for example, about 1:2 to 1:10.

The second sub-pixel electrode 210b may be electrically connected to the second drain electrode 152 through the second contact hole 162, and may correspond to a low-pixel since a voltage lower than the voltage applied to the first sub-pixel electrode 210a is applied to the second sub-pixel electrode 210b.

The shape of the first and second sub-pixel electrodes 210a and 210b as described above is merely exemplary. In one embodiment, the first and second sub-pixel electrodes 210a and 210b may be bent with respect to the gate line and the data line, or may be modified to have various other shapes relating to the branch portions and/or slit portions.

A light blocking member BM may be formed in a region in which the first to third contact holes 161, 162, and 163, the first to third switching devices Q1, Q2, and Q3, and the plurality of data lines DLj to DLj+1 overlap one another. For example, the light blocking member BM may be a black matrix. The light blocking member may be formed on the second substrate (upper substrate) in one embodiment.

In one embodiment, the pixel electrodes 210a and 210b and the contact electrode 230, a first alignment layer may be arranged on upper portions of the light blocking member BM. In one embodiment, a shield electrode may be formed in a region in which the plurality of data lines DLj to DLj+1 overlap each other. The shield electrode may be formed on the upper portion of the data lines DLj to DLj+1 to prevent interference between the electrodes that may occur, for example, due to an abrupt polarity change of the data voltage, and to prevent liquid crystal molecules LC on the upper portion of the data lines DLj to DLj+1 from being directly affected by the data voltage. The shield electrode may be, for example, in a state where the same voltage as the first voltage divider reference voltage R1i is applied thereto or in a floating state. In one embodiment, the shield electrode and the first voltage divider reference line may be electrically connected to each other.

The second substrate BS2 may be a substrate opposite to the first substrate BS1. The common electrode CE may be arranged on the second substrate BS2.

The common electrode CE may be a patternless electrode having no slit pattern. When the common voltage is applied, the common electrode CE forms an electric field with the first pixel electrode 210 on the first substrate BS1 that controls the alignment direction of the liquid crystal molecules LC of the liquid crystal layer LCL between the electrodes as described above. The common electrode may be a transparent electrode.

A second alignment layer may be formed on the common electrode CE.

The third pixel 13 may have a partially different construction from the first pixel 11 of FIG. 4.

Figure 6:
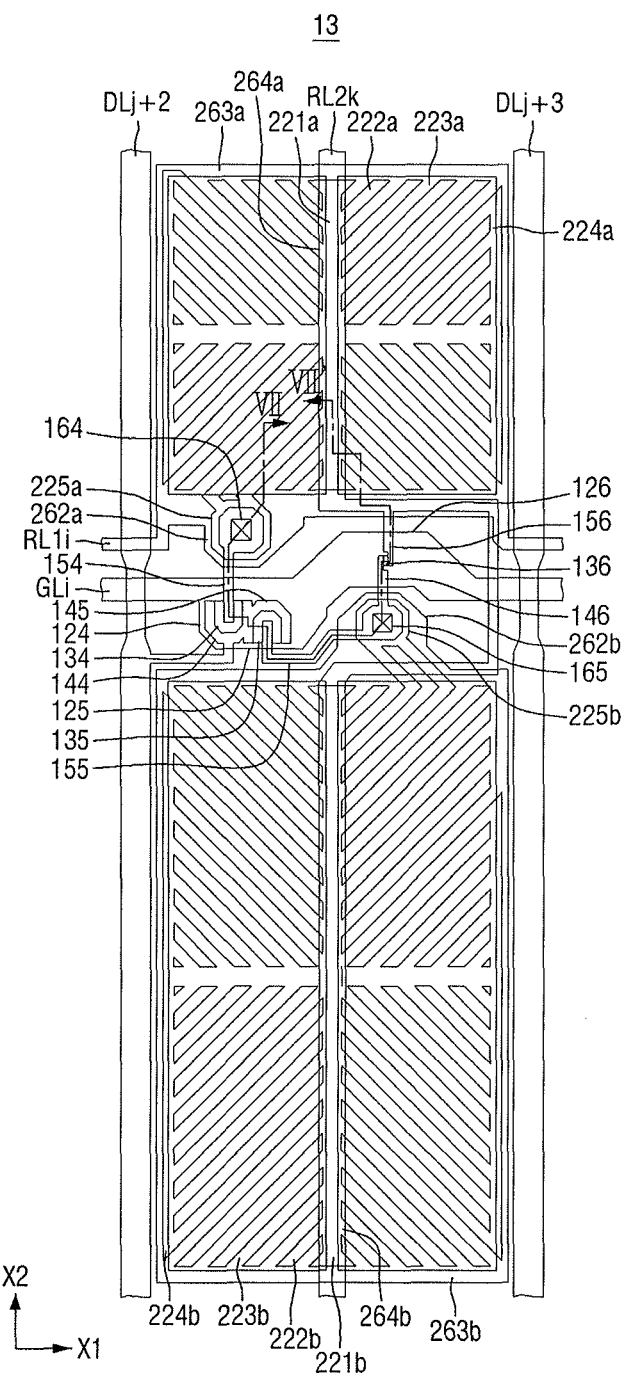
FIG. 6 illustrates another layout embodiment of a pixel.
Figure 7:
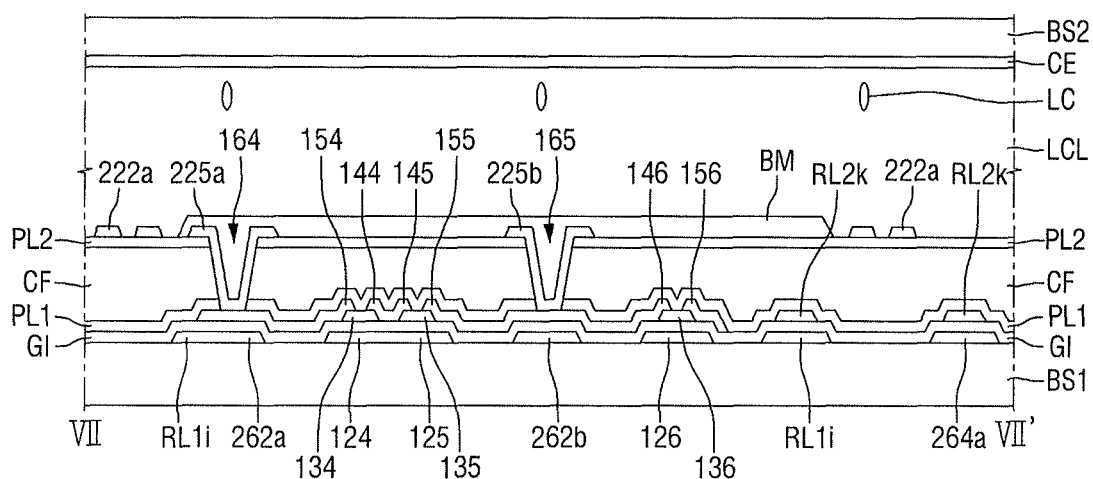
FIG. 7 illustrates a view taken along section line VII-VII' in FIG. 6.

FIG. 6 illustrates another layout embodiment of a pixel in FIG. 3, and FIG. 7 illustrates an example of a cross-sectional view taken along line VII-VII' in FIG. 6. Referring to FIGS. 6 and 7, the first gate line GLi is on the first substrate BS1, extends roughly in the first direction X1, and transfers a gate signal Gi to the fourth to sixth gate electrodes 124, 125, and 126 that are physically connected.

The first voltage divider reference line RL1i is formed on the same layer as the first gate line GLi and extends substantially in parallel to the first gate line GLi.

The first voltage divider reference line RL1i on the third pixel 13 includes hold electrodes 262a and 262b and edge hold electrode lines 263a and 263b, but unlike first pixel 11 of FIG. 4 does not include a separate voltage divider reference electrode. Since the third pixel 13 is not directly connected to the first voltage divider reference line RL1i, a separate electrode for establishing contact with the switching devices, for example, the voltage divider reference electrode 251 of the first pixel 11 of FIG. 4, may be omitted.

The first voltage divider reference line RL1i may include trunk hold electrode lines 264a and 264b. The trunk hold electrode lines 264a and 264b penetrate the center portion of third and fourth sub-pixel electrodes 220a and 220b in the second direction X2, and are formed in a region that overlaps parts of the trunk portions 221a and 221b of the third and fourth sub-pixel electrodes 220a and 220b. In another embodiment, the hole electrode and the hold electrode lines may be omitted and may have a different shape and/or arrangement.

A plurality of data lines DLj+2 to DLj+3 including the second data line DLj+2, and a second voltage divider reference line RL2k are formed on the gate insulating layer GI, fourth to sixth semiconductor layers 134, 135, and 136. The fourth to sixth semiconductor layers 134, 135, and 136 are formed in a region that overlaps the fourth to sixth gate electrodes 124, 125, and 126 in order. The second data line DLj+2 extends roughly in the second direction X2 and crosses the first gate line GLi. The second data line DLj+2 provides the second data signal Dj+2.

The shapes and arrangements of fourth and fifth source electrodes 114 and 145 and fourth and fifth drain electrodes 154 and 155 are substantially the same as the first and second source electrodes 141 and 142 in FIG. 4 and the first and second drain electrodes 151 and 152.

On the other hand, the sixth source electrode 146 is formed on the sixth gate electrode 126 and the sixth semiconductor layer 136. The sixth source electrode 146 is physically connected to the fifth drain electrode 155.

The sixth drain electrode 156 is formed on the sixth gate electrode 126 and the sixth semiconductor layer 136 and spaced apart from the sixth source electrode 146. The sixth drain electrode 156 may be physically connected to the second voltage divider reference line RL2ka formed on the same layer.

The second voltage divider reference line RL2k may extend roughly in the second direction X2, and may be electrically connected to a plurality of pixels in the same column. The arrangement of the second voltage divider reference line RL2k in one pixel 13 will be described in detail. The second voltage divider reference line RL2k is formed in a region that overlaps the trunk portion 221a of the third sub-pixel 220a and the trunk hold electrode line 264a of the first voltage divider electrode line RL1i to extend in the second direction X2. The second voltage divider reference line RL2k is physically connected to the sixth drain electrode 156 of the sixth switching device Q6.

Further, the second voltage divider reference line RL2$k$ bypasses the sixth switching device Q6 and a fifth contact hole 165 and is formed in a region that overlaps the trunk portion 221$b$ of the fourth sub-pixel 220$b$ and the trunk hold electrode line 264$b$ to extend in the second direction X2. The second voltage divider reference line RL2$k$ may form a hold capacitor with the trunk portions 221$a$ and 221$b$ of the third and fourth sub-pixel electrodes 220$a$ and 220$b$. A plurality of protection layers may be formed between the trunk portions 221$a$ and 221$b$.

In the liquid crystal display 1001, a plurality of red pixels R and a plurality of green pixels G receive the first voltage divider reference voltage R1$i$ from the first voltage divider reference line RL1$i$. A plurality of blue pixels receive the second voltage divider reference voltage W2$k$ from the second voltage divider reference line RL2$k$. Accordingly, it is possible to distribute the amount of current that otherwise may cause a voltage drop in the first and second voltage divider reference lines RL1$i$ and RL2$k$. Thus, it is possible to reduce or minimize a difference between the voltage divider reference voltage applied from the voltage divider reference driving unit and the voltage divider reference voltage transferred from the center portion of the display region to the first and second voltage divider reference lines RL1$i$ and RL2$k$, and to uniformly hold the intended first and/or second voltage divider reference voltages R1$i$ and R2$k$ over the whole line extension direction.

Accordingly, even if coupling occurs between the first and/or second voltage divider reference lines RL1$i$ and RL2$k$ and the pixel electrodes, for example, the first sub-pixel electrode 210$a$ and/or the third sub-pixel electrode 220$a$, the voltage, which forms an actual electric field and contributes to the control of the liquid crystal molecules, does not vibrate. As a result, the intended level and polarity of the voltage may be perfectly maintained.

Further, since the second voltage divider reference line RL2$k$ is connected only to low-wavelength pixels having low luminance contribution (e.g., blue pixels B), the luminance deterioration of the whole display panel or the corresponding decrease of an aperture ratio may be reduced or minimized. It therefore becomes possible to implement the second voltage divider reference line RL2$k$ that extends in the second direction X2. In one embodiment, by making the second voltage divider reference voltage applied to the blue pixels B higher than the first voltage divider reference voltage applied to other pixels R and G, a decrease in aperture ratio caused by the second voltage divider reference line that extends in the column direction may be compensated for.

In the same manner as the first pixel 11 in FIG. 4, a first protection layer PL1, a planarization layer CF, and a second protection layer PL2 may be entirely laminated on the data lines DL$j$+2 to DL$j$+3, the fourth to sixth switching devices Q4 to Q6, and the second voltage divider reference line RL2$k$.

The planarization layer CF, the second protection layer PL2, contact holes may be formed on the first protection layer PL1. The contact holes may expose parts of fourth and fifth drain electrodes 154 and 155. The fourth drain electrode 154 is electrically connected to the third sub-pixel electrode 220$a$ through the fourth contact hole 164. The fifth drain electrode 155 is electrically connected to the fourth sub-pixel electrode 220$b$ through the fifth contact hole 165.

The fourth contact hole 164, the fifth contact hole 165, a second pixel electrode 220 may be formed on a region exposed by the second protection layer PL2. The second pixel electrode 220 includes a third sub-pixel electrode 220$a$ and a fourth sub-pixel electrode 220$b$. The third sub-pixel electrode 220$a$ may correspond to a high-pixel, and the fourth sub-pixel electrode 220$b$ may correspond to a low-pixel. The second pixel electrode 220 may have a slit pattern. The arrangement and the function of the second pixel electrode 220 may substantially the same as the first pixel electrode 210.

Figure 8:
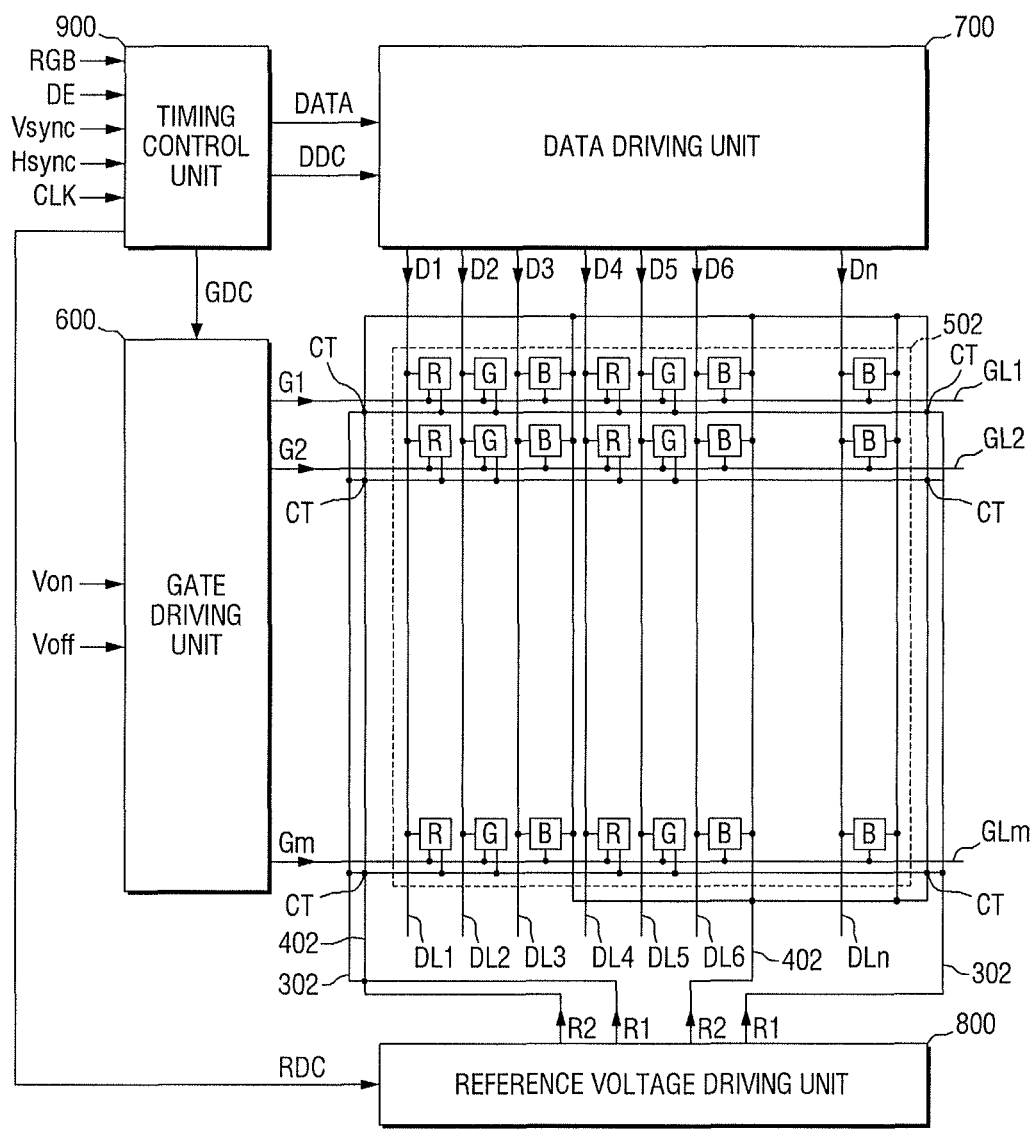
FIG. 8 illustrates another embodiment of a liquid crystal display.

FIG. 8 illustrates an embodiment of a liquid crystal display 1002 that includes a first voltage divider reference line bundle 302 and a second voltage divider reference line bundle 402. Each of the first voltage divider reference line bundle 302 and the second voltage divider reference line bundle 402 includes a plurality of first voltage divider reference lines and a plurality of second voltage divider reference lines. The first voltage divider reference lines extend in parallel to one another roughly in the row direction. The second voltage divider reference lines extend in parallel to one another roughly in the column direction.

In this embodiment, in a non-display region that surrounds a display region 502, regions in which the first voltage divider reference lines and the second voltage divider reference lines cross each other are electrically connected to one another through a plurality of contact points CT.

In the case where the first voltage divider reference line bundle 302 and the second voltage divider reference line bundle 402 have a mesh structure (in which the bundles 302 and 402 are electrically connected to each other, for example, as in FIG. 8), the amount of current flowing through the first voltage divider reference line bundle 302 and the second voltage divider reference line bundle 402 may be more effectively distributed. Further, since the plurality of contact points CT are formed on the non-display region, deterioration of the aperture ratio may be prevented.

In one embodiment, the first voltage divider reference line bundle 302 and the second voltage divider reference line bundle 402 may be turned on by contact points formed on not only on the non-display region but also the display region on which pixels are formed.

Figure 9:
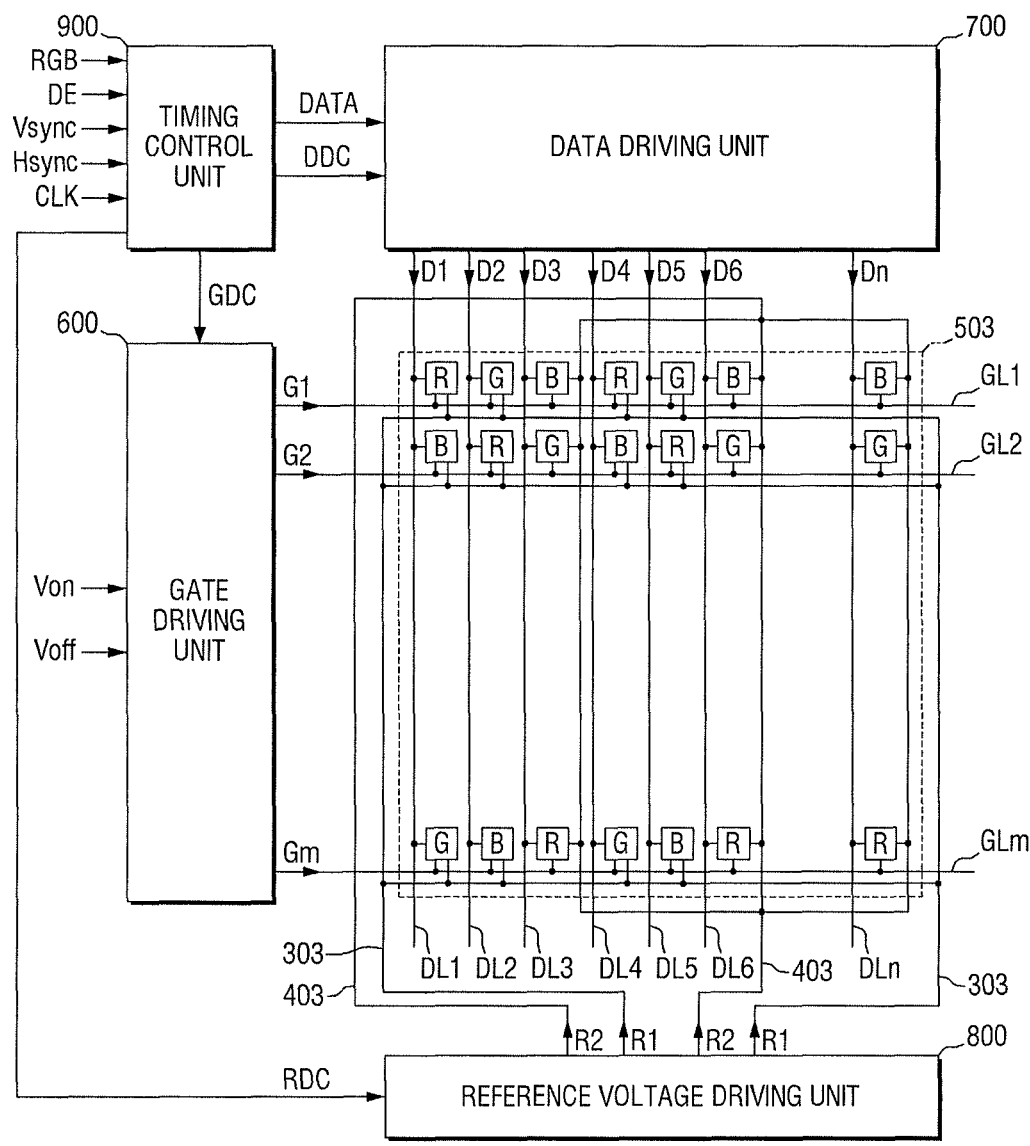
FIGS. 9 to 11 illustrate other embodiments of a liquid crystal display.

FIG. 9 illustrates an embodiment of a liquid crystal display 1003 which has a mosaic pixel arrangement, in which a red pixel R, a green pixel G, and a blue pixel B (which constitute a basic unit) are repeatedly arranged in a row direction and a red pixel R, a green pixel G, and a blue pixel B (which constitute a basic unit) are repeatedly arranged in a column direction.

In the embodiment of FIG. 1, the second voltage divider reference lines are electrically connected to the blue pixels, but are not electrically connected to the red and green pixels. In the embodiment of FIG. 9, the second voltage divider reference lines are electrically connected to not only the blue pixels B but also the red pixels R and the green pixels G. Through this arrangement, a mosaic pixel arrangement may be implemented without an increase in manufacturing costs, and also display quality may be improved.

Figure 10:
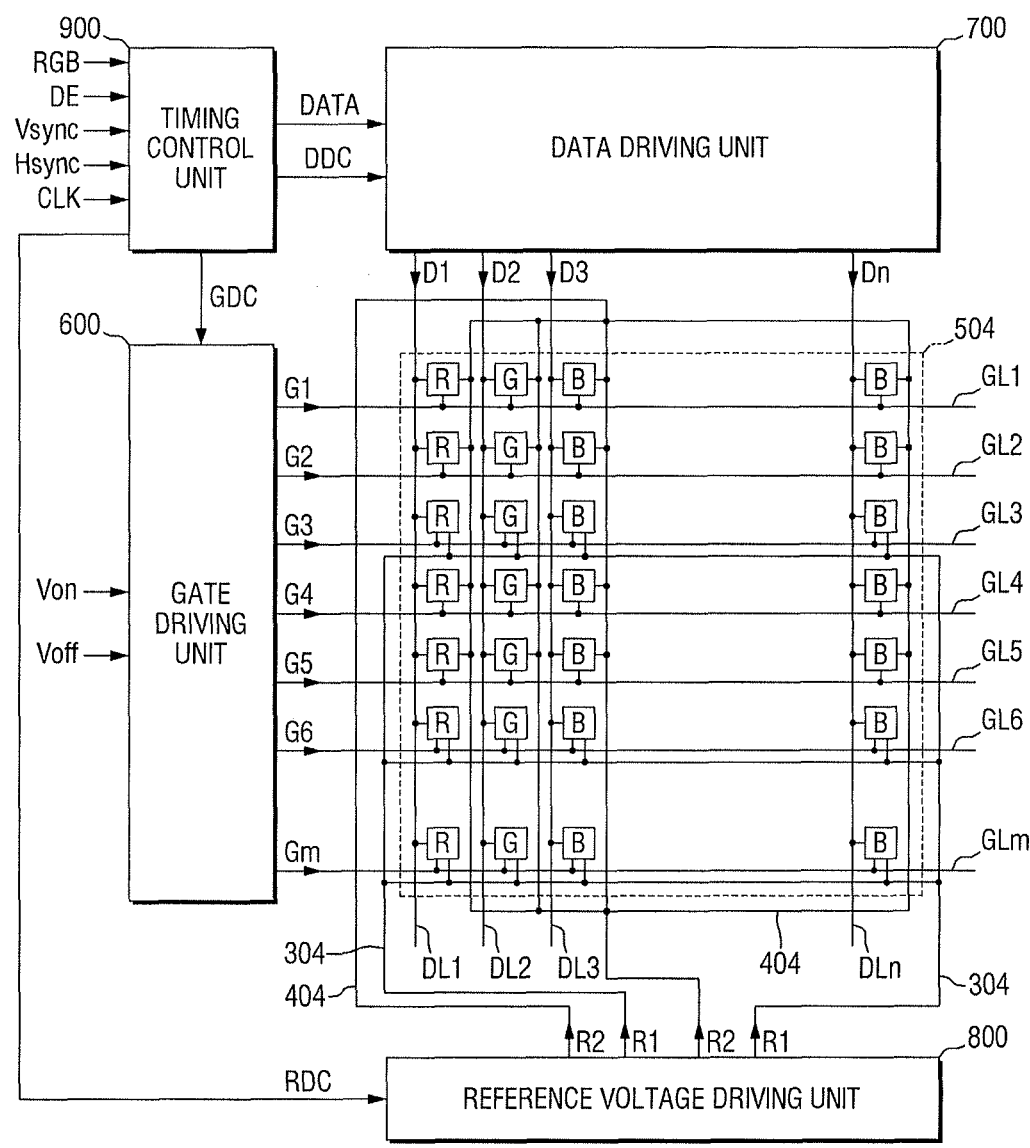

FIG. 10 illustrates an embodiment of a liquid crystal display 1004. Referring to FIG. 10, a plurality of first voltage divider reference lines that constitute a first voltage divider reference line bundle 304 extend roughly in the row direction, but are formed in a region that overlaps, for example, pixels that constitute the (multiples of 3)-th rows. Accordingly, the first voltage divider reference lines may be electrically connected to switching devices of the pixels that constitute the 9 multiples of 3)-th rows, and the number of the first voltage divider reference lines may be about ⅓ of the number of gate lines GL1 to GL$m$.

On the other hand, a plurality of second voltage divider reference lines that constitute a second voltage divider reference line bundle 404 extend roughly in the column direction. The number of the second voltage divider reference lines may be equal to the number of data lines DL1 to DLn. One of the second voltage divider reference lines may be formed in a region which overlaps the pixels that are repeatedly arranged in the column direction. However, one of the second voltage divider reference lines may not be directly connected to the switching devices of the pixels that constitute the (multiples of 3)-th row, but may be electrically connected to the switching devices of the pixels that constitute other rows.

As a result, for example, one pixel (e.g., a pixel on 2 row and 1 column in the drawing) may be electrically connected to the first data line DL1, the first gate line GL2, and the second voltage divider reference line that extends in the column direction. Another pixel (a pixel on 3 row and 1 column in the drawing) that belongs to the same column may be electrically connected to the first data line DL1, the second gate line GL3, and the first voltage divider reference line that extends in the row direction.

According to the liquid crystal display 1004, by reducing the number of the first voltage divider reference lines in the row direction (width direction) and reducing the number of second voltage divider reference lines in the column direction (length direction), the degree of freedom of the design may be improved on: the arrangement of the first and second voltage divider reference lines in the pixel region, the arrangement of the first voltage divider reference line bundle 304 in which the plurality of the first voltage divider reference lines are bundled, and the second voltage divider reference line bundle 404 in which the plurality of the second voltage divider reference lines are bundled, and the arrangement of the voltage divider reference voltage driving unit.

Figure 11:
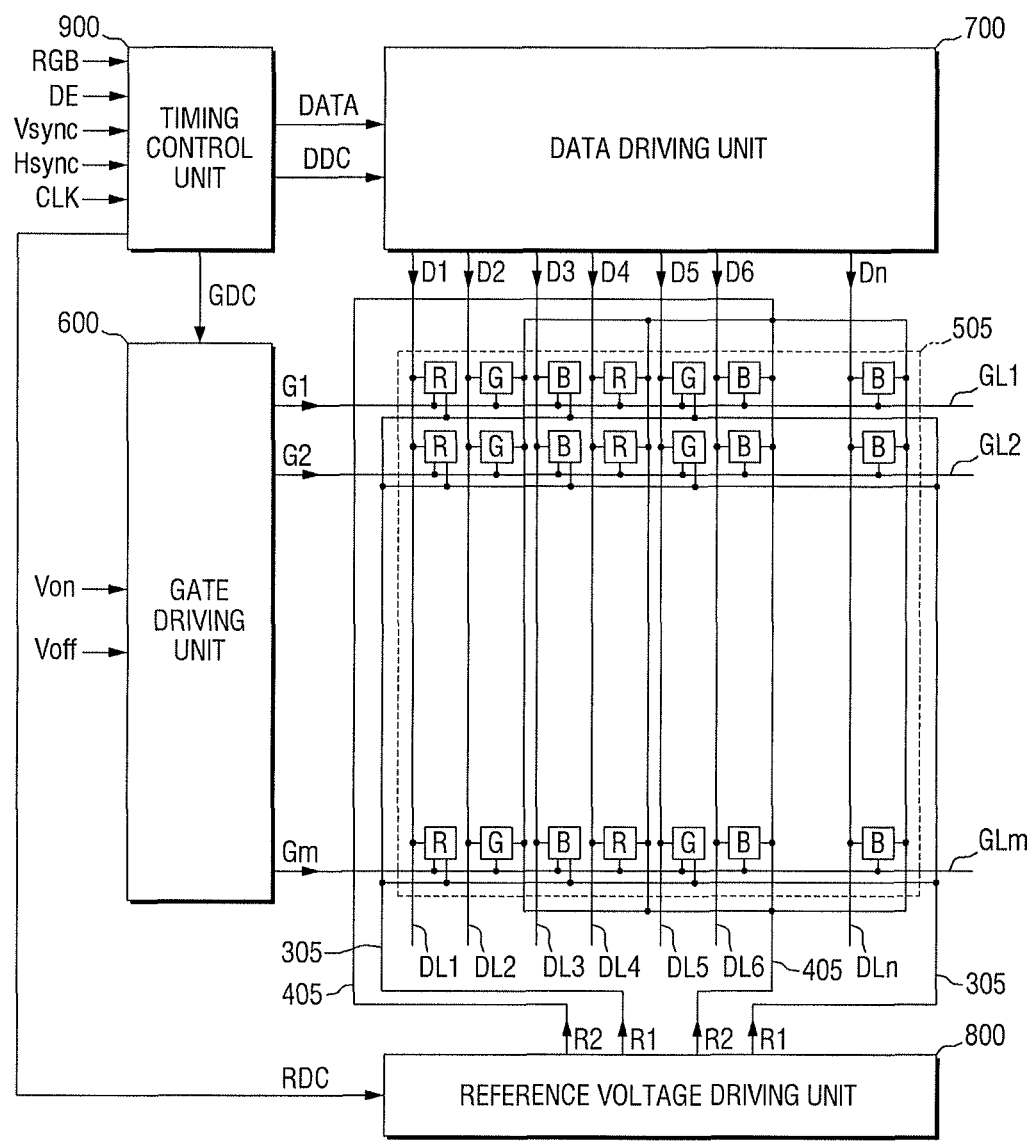

FIG. 11 illustrates an embodiment of a liquid crystal display 1005. Referring to FIG. 11, a plurality of first voltage divider reference lines that constitute a first voltage divider reference line bundle 305 extend roughly in the row direction. The number of the first voltage divider reference lines may be equal to the number of gate lines GL1 to GLm. One of the first voltage divider reference lines may be formed in a region that overlaps the pixels that are repeatedly arranged in the row direction, and may be electrically connected to the switching devices of the pixels that constitute odd-number columns but may not be directly connected to the switching devices of the pixels that constitute even-number columns.

On the other hand, a plurality of second voltage divider reference lines that constitute a second voltage divider reference line bundle 405 may extend roughly in the column direction. The number of the second voltage divider reference lines may be, for example, about ½ of the number of data lines DL1 to DLn. The second voltage divider reference lines may not be directly connected to the switching devices of the pixels that constitute the odd-number columns, but may be electrically connected to the switching devices of the pixels that constitute the even-number column.

According to the liquid crystal display 1005, the ratio of the number of pixels electrically connected to the first voltage divider reference line to the number of pixels electrically connected to the second voltage divider reference line is equally set to about 1:1. Thus, the amount of current that may cause the voltage drop may be uniformly distributed and voltage drop may be reduced or minimized.

FIGS. 12 to 15 are comparative cross-sectional views cut taken along line V-V' in FIG. 4 and line VII-VII' in FIG. 6 of embodiments of a method for manufacturing a liquid crystal display.

Figure 12:
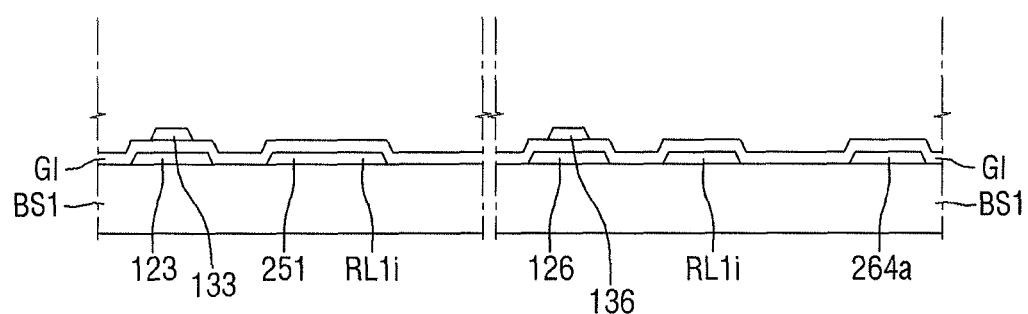
FIGS. 12 to 15 illustrate an embodiment of a method for manufacturing a liquid crystal display.

Referring to FIG. 12, a first metal layer is formed on a first substrate BS1 and patterned to form the first metal layer, third and sixth gate electrodes 123 and 126, a plurality of gate lines and a first voltage divider reference line RL1$i$, which includes a voltage divider reference electrode 251, a hold electrode, an edge hold electrode line, and a trunk hold electrode line 264$a$.

In one embodiment, the first metal layer may include an element selected, for example, from the group including tantalum (Ta), tungsten (W), titanium (Ti), molybdenum (Mo), aluminum (Al), copper (Cu), chrome (Cr), and neodymium (Nd), an alloy material containing the above-described elements, or a compound material. The patterning may be performed using a mask process. In another embodiment, a different patterning method may be used.

Next, a gate insulating layer GI is formed on the third and sixth gate electrodes 123 and 125, the gate line, and the voltage divider reference line RL1$i$ (which is formed of the first metal layer) over the whole first substrate BS1. In this case, a specific material may be deposited or spread. In an exemplary embodiment, a chemical vapor deposition (CVD) may be used.

Next, semiconductor material is deposited on the gate insulating layer GI. The semiconductor material is patterned to form third and sixth semiconductor layers 133 and 136 in a region that overlaps the third and sixth gate electrodes 123 and 126.

Figure 13:
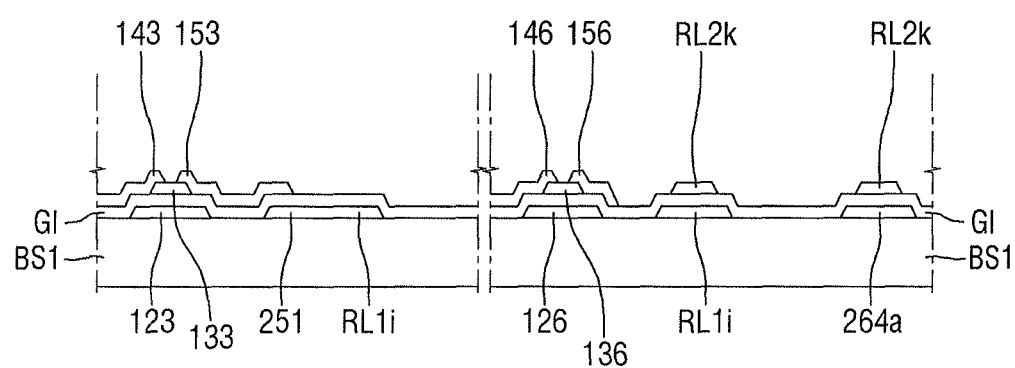

Next, referring to FIG. 13, a second metal layer is formed on an upper portion of the first substrate BS1 on which third and sixth semiconductor layers 133 and 136 are formed. The second metal layer is patterned to form the second metal layer, a third source electrode 143, a third drain electrode 153, a sixth source electrode, a sixth drain electrode 156, a plurality of data lines, and a second voltage divider reference line RL2$k$. Positions where the respective constituent elements are formed are as described above with reference to FIGS. 4 to 7. Accordingly, a third switching device Q3 and a sixth switching device Q6 are formed on the first substrate BS1.

The second metal layer may include a material selected, for example, from the group including silver (Ag), gold (Au), copper (Cu), nickel (Ni), platinum (Pt), palladium (Pd), iridium (Ir), rhodium (Rh), tungsten (W), aluminum (Al), tantalum (Ta), molybdenum (Mo), cadmium (Cd), zinc (Zn), iron (Fe), titanium (Ti), silicon (Si), germanium (Ge), zirconium (Zr), and barium (Ba), an alloy thereof, or metal nitride thereof.

Figure 14:
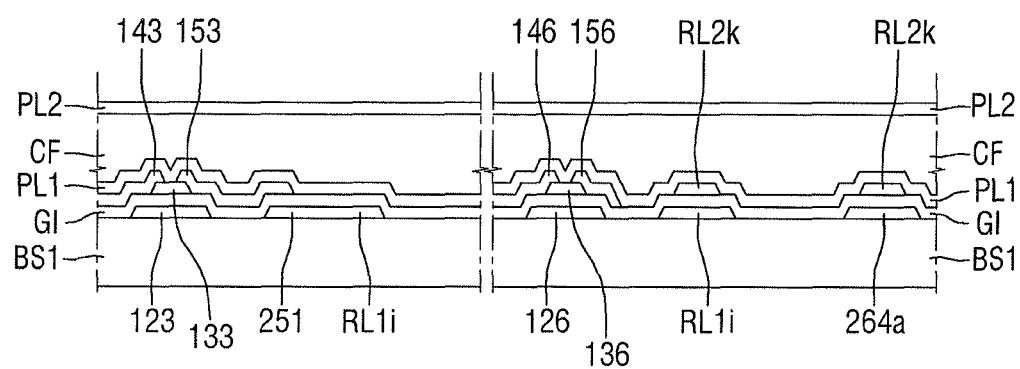

Then, referring to FIG. 14, a first protection layer PL1 is formed on an upper portion of the first substrate BS1 on which a source electrode, a drain electrode, a data line, and a second voltage divider reference line RL2$k$ are formed using chemical vapor deposition. The first protection layer PL1 may be formed of, for example, silicon nitride or silicon oxide.

Next, a color filter is formed on the first protection layer PL1, a planarization layer CF that includes color garment. A second protection layer PL2 may also be formed on an upper portion of the planarization layer CF.

Figure 15:
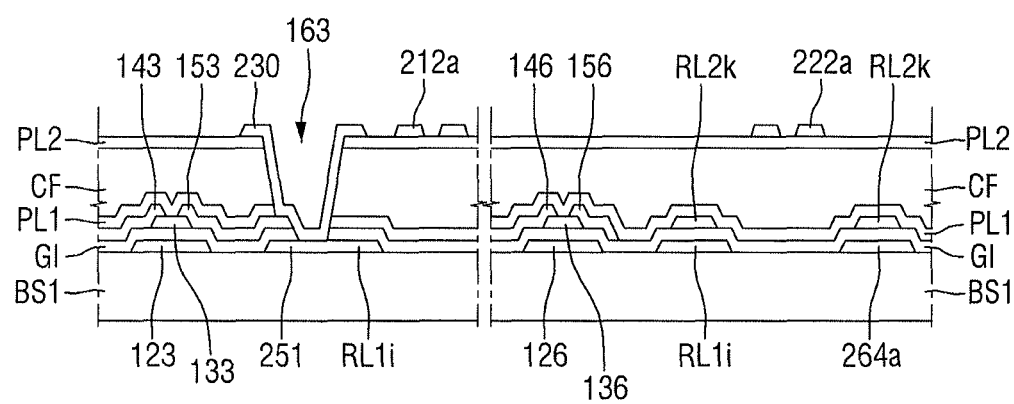

Then, referring to FIG. 15, a third contact hole 163 is formed by etching the second protection layer PL2, the planarization layer CF, and the first protection layer PL1. As described above with reference to FIGS. 4 to 7, a part of the third drain electrode 153 and a part of the voltage divider reference electrode 251 are exposed through the third contact hole 163. In contrast, a separate contact hole is not formed on an upper portion of the sixth drain electrode 156.

Next, a third metal layer is formed on the region that is exposed by the third contact hole 163 and the upper portion of the second protection layer PL2. A first sub-pixel electrode 210a, a third sub-pixel electrode 220a, and a contact electrode 230 are formed by patterning the third metal layer. The third drain electrode 153 and the voltage divider reference electrode 251, which are exposed by the third contact hole 163, are electrically connected to each other by the upper contact electrode 230. An example of a material that forms the third metal layer may be indium tin oxide (ITO) or indium zinc oxide (IZO).

Next, a light blocking member and a first alignment layer may be formed to produce an array substrate. Further, a liquid crystal layer may be formed by arranging an opposite substrate on the array substrate and injecting liquid crystal compositions between the two substrates, or the liquid crystal compositions may be put on the array substrate, and then the opposite substrate may be bonded thereto.

By way of summation and review, one type of liquid crystal display provides a pre-charge voltage to secure sufficient time for liquid crystal alignment, and turns on the switching device in at least two-phase period to secure sufficient driving force of the switching device. In this case, the number of switching devices that are simultaneously turned on is increased. Thus, an unintended voltage drop may occur on the voltage divider reference line.

Further, the voltage that is applied to the pixel electrode may differ from a pre-intended voltage due to coupling to the voltage divider reference line on which the voltage drop occurs. Accordingly, surface horizontal crosstalk may occur in a display region of the liquid crystal display.

In accordance with one or more of the aforementioned embodiments, a liquid crystal display is provided which may reduce surface horizontal crosstalk, which may improve the layout of a voltage divider reference line without experiencing an actual reduction of an aperture ratio and which may include an improved voltage divider reference line, and/or which may have improved reliability.

Example embodiments have been disclosed, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A liquid crystal display, comprising:
   a substrate including a display region and a non-display region;
   at least one first voltage divider reference line on the substrate and extending in a first direction;
   at least one second voltage divider reference line on the substrate and on a layer different from the at least one first voltage divider reference line, the at least one second voltage divider reference line extending in a second direction crossing the first direction;
   a first pixel electrode on the display region and including a first sub-pixel electrode and a second sub-pixel electrode, the second sub-pixel electrode to receive a voltage lower than a voltage to be applied to the first sub-pixel electrode;
   a second pixel electrode on the display region and including a third sub-pixel electrode and a fourth sub-pixel electrode, the fourth sub-pixel electrode to receive a voltage lower than a voltage to be applied to the third sub-pixel electrode;
   a first switching circuit including a first gate electrode, a first source electrode connected to the second sub-pixel electrode, and a first drain electrode connected to the at least one first voltage divider reference line; and
   a second switching circuit including a second gate electrode, a second source electrode connected to the fourth sub-pixel electrode, and a second drain electrode connected to the at least one second voltage divider reference line,
   wherein:
   the first drain electrode is electrically connected to the at least one first voltage divider reference line through a contact-hole, and
   the second drain electrode is integrally formed with the second voltage divider reference line.

2. The liquid crystal display as claimed in claim 1, wherein:
   the fourth sub-pixel electrode includes a horizontal trunk portion and a vertical trunk portion which divides the fourth sub-pixel electrode into a plurality of domains, and
   at least a part of the at least one second voltage divider reference line overlaps the vertical trunk portion.

3. The liquid crystal display as claimed in claim 2, wherein:
   the first voltage divider reference line includes a hold electrode line projecting from the at least one first voltage divider reference line, and
   at least part of the hold electrode line overlaps the vertical trunk portion of the fourth sub-pixel electrode and the at least one second voltage divider reference line.

4. The liquid crystal display as claimed in claim 1, further comprising:
   a first gate line and a second gate line on a same layer as the at least one first voltage divider reference line and extending in a direction that does not cross the first direction;
   a first data line and a second data line on a same layer as the at least one second voltage divider reference line and extending in a direction that crosses the first direction;
   a third switching device including a third gate electrode, a third source electrode, and a third drain electrode connected to the first source electrode; and
   a fourth switching device including a fourth gate electrode, a fourth source electrode, and a fourth drain electrode connected to the second source electrode.

5. The liquid crystal display as claimed in claim 4, wherein:
   the first gate electrode is connected to the first gate line,
   the second gate electrode is connected to the first gate line,
   the third gate electrode is connected to the first gate line,
   the fourth gate electrode is connected to the first gate line,
   the third source electrode is connected to the first data line, and the fourth source electrode is connected to the second data line.

6. The liquid crystal display as claimed in claim 5, wherein:
the first pixel electrode, the first switching circuit, and a third switching circuit define a first pixel region,
the second pixel electrode, the second switching circuit, and the fourth switching device define a second pixel region,
the at least one first voltage divider reference line extends in the first direction and overlaps the first pixel region and the second pixel region, and
the at least one second voltage divider reference line extends in a direction that crosses the first direction and does not overlap the first pixel region.

7. The liquid crystal display as claimed in claim 4, wherein:
the first gate electrode is connected to the first gate line,
the second gate electrode is connected to the second gate line,
the third gate electrode is connected to the first gate line,
the fourth gate electrode is connected to the second gate line,
the third source electrode is connected to the first data line, and
the fourth source electrode is connected to the first data line.

8. The liquid crystal display as claimed in claim 7, wherein:
the first pixel electrode, the first switching circuit, and the third switching device define a first pixel region,
the second pixel electrode, the second switching circuit, and the fourth switching device define a second pixel region,
the at least one first voltage divider reference line extends in the first direction and does not overlap the second pixel region, and
the at least one second voltage divider reference line extends in a direction that crosses the first direction and overlaps the first pixel region and the second pixel region.

9. The liquid crystal display as claimed in claim 1, further comprising:
a first color filter in a region that overlaps the first pixel electrode; and
a second color filter in a region that overlaps the second pixel electrode.

10. The liquid crystal display as claimed in claim 9, wherein a color to be output from the second color filter has a wavelength shorter than a wavelength of a color to be output from the first color filter.

11. The liquid crystal display as claimed in claim 9, wherein a second voltage divider reference voltage to be applied to the at least one second voltage divider reference line is greater than a first voltage divider reference voltage to be applied to the at least one first voltage divider reference line.

12. The liquid crystal display as claimed in claim 1, wherein the first voltage divider reference line is electrically connected to the second voltage divider reference line.

13. The liquid crystal display as claimed in claim 12, further comprising:
a plurality of first voltage divider reference lines and a plurality of second voltage divider reference lines,
ends of the first voltage divider reference lines are connected to each other to form a first voltage divider reference line bundle,
ends of the second voltage divider reference lines are connected to each other to form a second voltage divider reference line bundle, and
the first voltage divider reference line bundle and the second voltage divider reference line bundle are electrically connected to each other on the non-display region that is a light blocking region.

14. The liquid crystal display as claimed in claim 1, further comprising:
a voltage divider reference voltage driver on the non-display region,
wherein the first voltage divider reference line and the second voltage divider reference line are electrically connected to the voltage divider reference voltage driver.

15. The liquid crystal display as claimed in claim 1, further comprising:
a shield electrode on the substrate and in a region overlapping a data line,
wherein the shield electrode is electrically connected to the first voltage divider reference line.

16. A liquid crystal display, comprising:
a first substrate;
at least one data line on the first substrate and extending in a first direction, the at least one data line to receive a data voltage;
at least one first voltage divider reference line on the first substrate and extending to cross the data line, the at least one first voltage divider reference line to receive a first voltage divider reference voltage; and
at least one second voltage divider reference line on the first substrate and extending to cross the first voltage divider reference line, the at least one second voltage divider reference line to receive a second voltage divider reference voltage, wherein
the first voltage divider reference line and the data line are on different layers, wherein a polarity of the data voltage is to change on a frame-by-frame basis, and a level of the data voltage is different from a level of the second voltage divider reference voltage in one frame period.

17. The liquid crystal display as claimed in claim 16, further comprising:
a second substrate facing the first substrate; and
a common electrode on the second substrate and facing the first substrate, the common electrode to receive a common voltage, wherein a level of a voltage difference between the data voltage and the common voltage is greater than a level of a voltage difference between the second voltage divider reference voltage and the common voltage in the one frame period.

18. The liquid crystal display as claimed in claim 16, wherein the first voltage divider reference line and the second voltage divider reference line are on different layers.

19. The liquid crystal display as claimed in claim 18, wherein a level of the first voltage divider reference voltage is substantially equal to a level of the second voltage divider reference voltage.

* * * * *